United States Patent Office 3,776,883
Patented Dec. 4, 1973

3,776,883
FLAME RETARDANT POLYESTER COMPOSITIONS
Robert William Stackman, Morristown, N.J., assignor to Celanese Corporation, New York, N.Y.
No Drawing. Filed Apr. 3, 1972, Ser. No. 240,765
Int. Cl. C08g 51/62
U.S. Cl. 260—45.75 B                 1 Claim

ABSTRACT OF THE DISCLOSURE

Flame retardant synthetic linear polyester compositions are provided which comprise from 1 to about 25 weight percent, based on the weight of the polyester composition, of an organo-arsenic compound which contains at least 5 weight percent of arsenic and has a boiling point of at least 20° C. higher than the melting point of the polyester. Suitable compounds for poly(ethylene terephthalate) include ethylenebis(diphenylarsine) and tetraphenylarsonium chloride.

BACKGROUND OF THE INVENTION

This invention relates generally to synthetic linear polyester compositions containing arsenic. More particularly, the invention relates to melt blends of synthetic linear polyesters with certain organo-arsenic compounds which impart flame retardant properties to said compositions.

As is well known, certain polyesters enjoy wide-spread commercial acceptace for the production of oriented shaped articles such as fibers and films, and for the production of molded articles. However, most polyesters, and poly(ethylene terephthalate) and poly(tetramethylene terephthalate) in particular, are flammable, i.e. not only are deficient in their ability to resist ignition upon application of a flame but are also deficient in their ability to self-extinguish. This flammability makes commercial polyesters unsuitable for the production of fibers and film to be employed in such end-uses as children's clothing and sleepwear, carpets, sheets, and draperies.

Although the prior art contains some examples of non-flammable polyester compositions none have found commercial acceptance for oriented shaped articles. Unfortunately, efforts to provide non-flammable polyester compositions have been successful only at the expense of fiber properties such as tenacity, elongation, initial modulus, resilience, resistance to pilling, color, and toxicity. The term "non-flammable" as used herein means the ability of a composition or draped article or product made therefrom to self extinguish upon removal of the flame source, in air.

A comprehensive review of molded flame-retardant polyester resins with a summary of characteristics of six methods generally used for evaluation of flame resistance is given in "Self-Extinguishing Polyester Resins" (Industrial and Engineering Chemistry, vol. 59, No. 5, May 1967 by R. C. Nametz). This article makes no mention whatsoever of any compound containing arsenic, even though thousands of different compounds including phosphorus and antimony compounds are discussed with regard to their suitability as a flame retardant for molded polyester resins, and even though arsenic lies between phosphorus and antimony in group 5a of the Periodic Table (Fischer Scientific).

Likewise it appears that none of the thousand U.S. patents listed in "Flame Retardants 1967 Through June 1971" by Lexington Associates discloses the use of a compound containing arsenic as a flame retardant.

Organic compounds of arsenic are seldom found in nature, but a large number of different types have been synthesized, because of their potential therapeutic value—compounds of arsenic have been used as therapeutic agents for at least 2,500 years.

SUMMARY OF THE INVENTION

The applicant has now very surprisingly discovered that certain compounds containing arsenic impart significantly superior flame retardant properties to synthetic linear polyester compositions such as poly(ethylene terephthalate) and poly(tetramethylene terephthalate) at relatively low concentrations of flame retardant additive.

It is therefore an object of the present invention to provide arsenic-containing polyester compositions which are flame retardant or non-flammable, are economically and technically acceptable, and are effective at low levels of concentration.

In particular, applicant's invention relates to arsenic-containing synthetic linear polyester compositions having improved flame retardant properties wherein said compositions comprise an organo-arsenic compound at a concentration of from about 1 to about 25 weight percent based on the weight of said composition, said compound has a boiling point of at least 20° C. higher than said polyester's melting point, and said compound contains at least 5 percent by weight of arsenic based on the weight of said compound.

DETAILED DESCRIPTION OF THE INVENTION

The term "synthetic linear polyester" as used herein comprehends as a class, polyesters prepared by the polycondensation of a dicarboxylic acid or its lower alkyl ester with a diol wherein said dicarboxylic acid and said diol independently may be aliphatic, cycloaliphatic, or aromatic. Preferably, said synthetic linear polyesters are prepared from terephthalic acid or its lower dialkyl ester and a polymethylene glycol having the general formula:

$$HO(CH_2)_qOH$$

where $q$ is an integer from 2 to about 8. The most preferred polyesters, poly(ethylene terephthalate) and poly-(tetramethylene terephthalate), are obtained when $q$ is 2 and 4, respectively. By "lower alkyl ester" is meant an ester derived from an aliphatic alcohol having from 1 to about 6 carbon atoms. Film and fiber-forming polyesters are preferred, which may exhibit an intrinsic viscosity in o-chlorophenol at 25° C. of at least 0.40 deciliter per gram.

The particular organo-arsenic compounds useful for flame retardants have a boiling point of at least 20° C. higher than the melting point of the synthetic linear polyester. Thereby, little or no vaporization occurs of the arsenic compound during normal melt extrusion processes. Also the arsenic compound preferably has a melting point below the melting point of the polyester in order to obtain good melt blending. For example, with poly(ethylene terephthalate) which has a melting point of about 265° C. and is typically melt spun at 280° C., it is preferred to use tetraphenylarsonium chloride which has a melting point of 264.5° C. rather than tetraphenylarsonium bromide which has a melting point of 282.5° C.

Many different arsenic compounds may be used in the instant invention and include those listed in Table 1. Trivalent arsenic compounds are preferred to pentavalent arsenic compounds. Linear compounds are preferred to cyclic compounds.

Linear compounds of trivalent arsenic include the following:

Firstly, tertiary arsines and their derivatives may be used, such as symmetric derivatives, unsymmetric $R_2R'As$ derivatives, ditertiary arsines, tritertiary arsine, tetratertiary arsines, and polymers with tertiary arsine groups. Preferred tertiary arsines and their derivatives include those selected from the group consisting of Compounds 1-54 of Table 1. The most preferred examples of tertiary arsine and their derivatives include those selected from the following compounds of Table 1: 1, 2, 4, 5, 6, 7, 8, 9, 10, 11, 15, 16, 17, 18, 19, 20, 21, 23, 24, 25, 26, 27, 28, 29, 30, 31, 32, 33, 34, 35, 36, 37, 38, 39, 40, 46, 47, 48, 49, and 50.

Secondly, compounds with As—As bonds may be used. Symmetric arsino compounds are preferred. Most preferred are compounds selected from the group consisting of compounds 53, 54 and 55 of Table 1.

Thirdly, compounds with arsenic-halogen bonds may be used. Secondary haloarsines are preferred. Most preferred are compounds selected from the group consisting of Compounds 56, 57, 58, 59 and 60 of Table 1.

Fourthly, compounds of arsenic bonded to group VI-A elements may be used. Oxybisarsines are preferred. Most preferred are compounds selected from the group consisting of Compounds 61, 62, 63 and 64 of Table 1.

Fifthly, compounds of arsenic bonded to group VA elements may be used. Compounds with arsenic-phosphorus bonds are preferred. Most preferred are compounds selected from the group consisting of Compounds 65 and 66 of Table 1.

Linear compounds of pentavalent arsenic include the following:

Firstly, quaternary derivatives may be used. It is preferred to use quaternary arsonium bases and salts. It is most preferred to use Compound 67 of Table 1.

Secondly, tertiary derivatives may be used. It is preferred to use halohydroxy derivatives, haloalkoxy derivatives and tertiary arsine oxide. It is most preferred to use Compounds 68, 69, 70 and 71 of Table 1.

Heterocyclic arsenic compounds may be used and include the following:

Firstly, five-membered ring systems may be used. It is preferred to use ring systems with arsenic heteroatoms, particularly the following and their derivatives: isoarsinodoline, benzodiarsole, spiro(dibenzarsole), oxadiarsolane and benzoxadiarsole. It is most preferred to used Compounds 72-84 of Table 1.

Secondly, 6-membered ring systems may be used. It is preferred to use ring systems with either one or two arsenic heteroatoms, particularly arsenane and arsenin derivatives, arsinoline derivatives, acridarsine derivatives, spirobisarsonoline derivatives, diarsenane and benzodiarsenin derivatives, arsanthrene derivatives, oxarsinane and phenoxarsine derivatives, and tetraoxadiarsaspiro [5.5]hendecane derivatives. It is most preferred to use Compounds 85-114 of Table 1.

The arsenic compounds of the present invention may be prepared by methods similar to those well known in the prior art. The organo-arsenics may be prepared as indicated in "Organo-Metallic Compounds" Volume III, 2nd Edition, edited by M. Dub, from page 1 to page 652 which is cross-referenced in the last column of Table 1.

Melt blending of the arsenic compounds with poly(ethylene terephthalate) typically results in a polymer with reduced flammability as shown by the examples. In particular, compounds containing arsenic have been found to be more effective at lower concentrations than equivalent compounds containing antimony. It is therefore possible to obtain flame retardant polyester compositions which generate less toxic fumes than those generated by the equivalent antimony compounds, since arsenic is less toxic than antimony and lower concentrations are needed.

The following standard fire retardant test was used. A loose bundle of fibers is subjected at its base to a 1 inch long flame at a temperature around 600° C., to cause the fiber to ignite and then the flame is removed. The fire-retardancy is rated as being from 1 to 5; 5 indicating that the fibers do not ignite; 4 indicating that the fibers are hard to ignite and immediately drip out on removal of the flame; 3 indicates that the fibers burn but on removal of the flame they drip out fairly quickly and consistently; 2 indicating that the fibers burn vigorously but eventually drip out; 1 indicating that the fibers burn completely with little or no dripping.

The following examples illustrate the applicants invention but are not to be deemed limitative thereof. Unless otherwise stated, all parts are by weight and all temperatures are in degrees centigrade. Control examples are included to show the superiority of the instant invention over both untreated polyester compositions and polyester compositions comprising compounds containing adjacent elements in the periodic table of antimony, germanium, tin, and silicon.

Examples 1-13

Various additives under examination are intimately blended at different concentrations with pulverized poly(ethylene terephthalate) having an inherent viscosity of 0.60 deciliters/gram measured at a concentration of 8% in ortho-chlorophenol at a temperature of 25° C. The mixture is then extruded from a melt index unit at a temperature of 280° C. to give a loose bundle of fibers. The loose bundle of fibers is then subjected to the above mentioned fire-retardancy tests and the results are given in Table 2.

In particular it will be noticed that at the relatively low concentration of 5 weight percent based on the total weight of the polyester composition, both ethylenebis(diphenylarsine) and tetraphenylarsonium chloride give a fire retardancy rating of 4 in contrast to the other non-arsenic additives of the same concentration which give much lower fire retardancy ratings, e.g. tetraphenylantimony bromide at a rating of 1, tetraphenylsilane at a rating of 2, tetraphenylgermanium at a rating of 2, and triphenyltin hydroxide causes cross-linking and a fiber cannot be obtained. The control without any additive has a fire retardancy rating of 1.

TABLE 1.—ORGANO-ARSENIC COMPOUNDS

| Number | Name | Formula | Preparation [1] |
|---|---|---|---|
| 1 | Tri(4-bromophenyl)arsine | $(4\text{-}BrC_6H_4)_3As$ | 1.1.1 |
| 2 | Tri(4-chlorophenyl)arsine | $(4\text{-}ClC_6H_4)_3As$ | 1.1.1 |
| 4 | Triphenylarsine | $Ph_3As$ | 1.1.1 |
| 4 | Tri-o-tolylarsine | $(2\text{-}MeC_6H_4)_3As$ | 1.1.1 |
| 5 | Tri-m-tolylarsine | $(3\text{-}MeC_6H_4)_3As$ | 1.1.1 |
| 6 | Tri-p-tolylarsine | $(4\text{-}MeC_6H_4)_3As$ | 1.1.1 |
| 7 | Tri-m-anisylarsine | $(3\text{-}MeOC_6H_4)_3As$ | 1.1.1 |
| 8 | Tri-p-anisylarsine | $(4\text{-}MeOC_6H_4)_3As$ | 1.1.1 |
| 9 | Diphenyl(trifluoromethyl)arsine | $Ph_2AsCF_3$ | 1.1.2 |
| 10 | Di(p-bromophenyl)methylarsine | $(4\text{-}BrC_6H_4)_2AsMe$ | 1.1.2 |
| 11 | (4-bromophenyl)diphenylarsine | $4\text{-}BrC_6H_4AsPh_2$ | 1.1.2 |
| 12 | 2-(diphenylarsino)benzoic Acid | $2\text{-}(Ph_2As)C_6H_4CO_2H$ | 1.1.2 |
| 13 | Diphenyl-p-tolylarsine | $4\text{-}MeC_6H_4AsPh_2$ | 1.1.2 |
| 14 | B-(diphenylarsino)propiophenone | $Ph_2AsCH_2CH_2Bz$ | 1.1.2 |
| 15 | Ethylenebis(methylphenylarsine) | $MePhAsCH_2CH_2AsPhMe$ | 1.1.4 |
| 16 | 2,2'-biphenylylenebis(dimethylarsine) | $(2\text{-}C_6H_4AsMe_2)_2$ | 1.1.4 |
| 17 | 4,4'-stilbenylenebis(dimethylarsine) | $Me_2AsC_6H_4CH{=}CHC_6H_4AsMe_2$ | 1.1.4 |
| 18 | Ethylenebis(ethylphenylarsine) | $EtPhAsCH_2CH_2AsPhEt$ | 1.1.4 |
| 19 | Ethylenebis(dibutylarsine) | $Bu_2AsCH_2CH_2AsBu_2$ | 1.1.4 |
| 20 | As,As-dimethyl-As',As'-diphenyl-o-phenylenediarsine | $2\text{-}Me_2AsC_6H_4AsPh_2$ | 1.1.4 |
| 21 | 2,2'-biphenylenebis(diethylarsine) | $2\text{-}Et_2AsC_6H_4C_6H_4AsEt_2\text{-}2$ | 1.1.4 |
| 22 | o-Terphenylene-2,2''-bis(dimethylarsine) | $o\text{-}C_6H_4(C_6H_4AsMe_2)_2$ | 1.1.4 |
| 23 | 4,4'-stilbenylenebis(diethylarsine) | $Et_2AsC_6H_4CH{=}CHC_6H_4AsEt_2$ | 1.1.4 |

TABLE 1—Continued

| Number | Name | Formula | Preparation [1] |
|---|---|---|---|
| 24 | Ethylenebis(butylphenylarsine) | BuPhAsCH$_2$CH$_2$AsPhBu | 1.1.4 |
| 25 | o-Phenylenebis(dibutylarsine) | o-C$_6$H$_4$(AsBu$_2$)$_2$ | 1.1.4 |
| 26 | 2,2-bis[p-(diethylarsino)phenyl]propane | [Et$_2$As—⟨○⟩—]$_2$CMe$_2$ | 1.1.4 |
| 27 | Ethynylenebis(diphenylarsine) | Ph$_2$AsC≡CAsPh$_2$ | 1.1.4 |
| 28 | Ethylenebis(diphenylarsine) | Ph$_2$AsCH$_2$CH$_2$AsPh$_2$ | 1.1.4 |
| 29 | Ethynylenebis(dicyclohexylarsine) | (C$_6$H$_{11}$)$_2$AsC≡CAs(C$_6$H$_{11}$)$_2$ | 1.1.4 |
| 30 | Trimethylenebis(diphenylarsine) | Ph$_2$As(CH$_2$)$_3$AsPh$_2$ | 1.1.4 |
| 31 | Tetramethylenebis(diphenylarsine) | Ph$_2$As(CH$_2$)$_4$AsPh$_2$ | 1.1.4 |
| 32 | Tetramethylenebis(dicyclohexylarsine) | (C$_6$H$_{11}$)$_2$As(CH$_2$)$_2$As(C$_6$H$_{11}$)$_2$ | 1.1.4 |
| 33 | Pentamethylenebis(diphenylarsine) | Ph$_2$As(CH$_2$)$_5$AsPh$_2$ | 1.1.4 |
| 34 | o-Phenylenebis(diphenylarsine) | 2-Ph$_2$AsC$_6$H$_4$AsPh$_2$ | 1.1.4 |
| 35 | m-Phenylenebis(diphenylarsine) | 3-Ph$_2$AsC$_6$H$_4$AsPh$_2$ | 1.1.4 |
| 36 | p-Phenylenebis(diphenylarsine) | 4-Ph$_2$AsC$_6$H$_4$AsPh$_2$ | 1.1.5 |
| 37 | Hexamethylenebis(diphenylarsine) | Ph$_2$As(CH$_2$)$_6$AsPh$_2$ | 1.1.5 |
| 38 | 4,4-stilbenylenebis(diphenylarsine) | Ph$_2$AsC$_6$H$_4$CH=CHC$_6$H$_4$AsPh$_2$ | 1.1.5 |
| 39 | Ethynylenebis(di-1-naphthylarsine) | (1-C$_{10}$H$_7$)$_2$AsC≡CAs(C$_{10}$H$_7$-1)$_2$ | 1.1.5 |
| 40 | Bis[2-(diphenylarsino)phenyl]phenylphosphine | [2-(Ph$_2$As)C$_6$H$_4$]$_2$PPh | 1.1.5 |
| 41 | Bis[2-(diphenylarsino)phenyl]arsine | [2-(Ph$_2$As)C$_6$H$_4$]$_2$AsPh | 1.1.5 |
| 42 | Tris[2-(diphenylarsino)phenyl]phosphine | [2-(Ph$_2$As)C$_6$H$_4$]$_3$P | 1.1.6 |
| 43 | Tris[3-(dimethylarsino)propyl]arsine | (Me$_2$AsCH$_2$CH$_2$CH$_2$)$_3$As | 1.1.6 |
| 44 | Tris[o-(diphenylarsino)phenyl]arsine | [2-(Ph$_2$As)C$_6$H$_4$]$_3$As | 1.1.6 |
| 45 | Poly(2,5-thienylenephenylarsine) | [thiophene-As(Ph)]$_n$ | 1.1.7 |
| 46 | Poly(p-phenylenephenylarsine) | [C$_6$H$_4$As(Ph)]$_n$ | 1.1.7 |
| 47 | Poly[(5-bromo-2-methoxy-m-phenylene)phenylarsine] | [Br,OMe-C$_6$H$_2$-As(Ph)]$_n$ | 1.1.7 |
| 48 | Poly[(4,6-dimethoxy-m-phenylene)phenylarsine] | [(MeO)$_2$C$_6$H$_2$-As(Ph)]$_n$ | 1.1.7 |
| 49 | Poly(4,4'-biphenylylenephenylarsine) | [C$_6$H$_4$C$_6$H$_4$As(Ph)]$_n$ | 1.1.7 |
| 50 | Poly{[oxybis(p-phenylene)]phenylarsine} | [C$_6$H$_4$OC$_6$H$_4$As(Ph)]$_n$ | 1.1.7 |
| 51 | Poly[(9,10-anthrylene)phenylarsine] | [anthrylene-As(Ph)]$_n$ | 1.2 |
| 52 | Poly[p-(diphenylarsino)styrene] | [CH-CH$_2$]$_n$ with pendant C$_6$H$_4$-AsPh$_2$ | 1.2 |
| 53 | Arsenomethane | (MeAs)$_5$ ring; [AsMe]$_n$ | 1.4.2.1 |
| 54 | Arsenobenzene | (PhAs)$_6$ ring; and [AsPh]$_n$ | 1.4.2.1 |

TABLE 1—Continued

| Number | Name | Formula | Preparation [1] |
|---|---|---|---|
| 55 | 2,2'-arsenobis(4-vinylanisole)polymer | 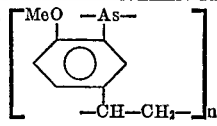 | 1.4.2.1 |
| 56 | Trimethylenebis (bromophenylarsine) | PhBrAs(CH$_2$)$_3$AsBrPh | 1.5.1 |
| 57 | Hexamethylenebis(bromphenylarsine) | PhBrAs(CH$_2$)$_6$AsBrPh | 1.5.1 |
| 58 | Bis(2-biphenylyl)chloroarsine | (2-PhC$_6$H$_4$)$_2$AsCl | 1.5.1 |
| 59 | Chlorobis (4-methyl-2-biphenylyl)arsine | [2,5-Ph(Me)C$_6$H$_3$]$_2$AsCl | 1.5.1 |
| 60 | Chlorobis (1-phenyl-2-naphthyl)arsine | (1-PhC$_{10}$H$_6$)$_2$AsCl | 1.5.1 |
| 61 | Oxybis[bis(2,4,6-Tribromophenyl)arsine] | [(2,4,6-Br$_3$C$_6$H$_2$)$_2$As]$_2$O | 1.6.1.4 |
| 62 | Oxybis(4-bromodiphenylarsine) | [Ph(4-BrC$_6$H$_4$)As]$_2$O | 1.6.1.4 |
| 63 | Oxybis(diphenylarsine) | (Ph$_2$As)$_2$O | 1.6.1. |
| 64 | Oxybis bis[o-(trifluoromethyl(phenyl]arsine | {(2-CF$_3$C$_6$H$_4$)As]$_2$O | 1.6.1.4 |
| 65 | Dimethyl (dimethylarsino)phosphine sulfide | Me$_2$AsP(S)Me$_2$ | 1.7.2 |
| 66 | Pentamethylarsinophosphonium iodide | [Me$_2$AsPMe$_3$]I | 1.7.2 |
| 67 | Tetraphenylarsonium chloride | Ph$_4$As$^+$Cl$^-$ | 2.2.2 |
| 68 | Diethylpropylpropoxyarsonium iodide | Et$_2$PrAs(OPr)I | 2.3.5.2 |
| 69 | Diethylpropylpropoxyarsonium iodide | Et$_2$PrAs(OPr)I | 2.3.5.3 |
| 69 | Triphenylarsine oxide | Ph$_3$AsO | 2.3.6.1.3 |
| 70 | Methylenebis(diphenylarsine) oxide | Ph$_2$AsCH$_2$As(O)Ph$_2$ | 2.3.6.1.6 |
| 71 | Tris [2-(2-carboxyvinyl)phenyl]arsine oxide | (o-HO$_2$CCH=CHC$_6$H$_4$)$_3$AsO | 2.3.6.1.6 |
| 72 | 2,2'-o-phenylenebis(5-chloroarsindoline) | 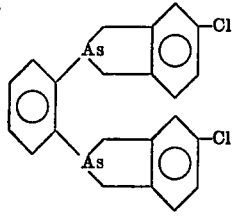 | 3.3.1.4 |
| 73 | 2,2'-o-phenylenedi (isoarsindoline) | 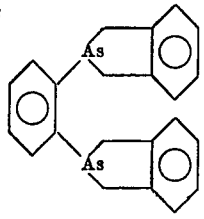 | 3.3.1.4 |
| 74 | 2,3-dihydro-1,1,3,3-tetramethyl-1H-1,3-benzodiarsolium salts | 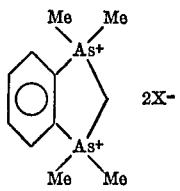 | 3.3.1.5 |
| 75 | Dibenzarsole | 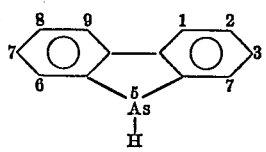 | 3.3.1.6 |
| 76 | Spiro(dibenzarsole) chloride | 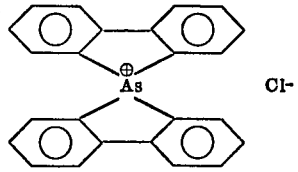 | 3.3.1.7 |
| 77 | Spiro(dibenzarsole) iodide | 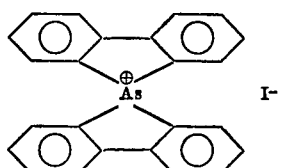 | 3.3.1.7 |
| 78 | 1,3-diphenyl-2,1,3-oxadiarsolane | 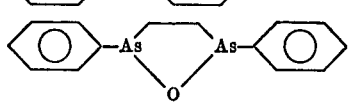 | 3.3.5.1 |
| 79 | 1,3-diphenyl-2,1,3-oxadiarsolane 1,3-dioxide |  | 3.3.5.1 |

TABLE 1—Continued

| Number | Name | Formula | Preparation [1] |
|---|---|---|---|
| 80 | 1,3-dichloro-1,3-dihydro-2,1,3-benzoxadiarsole | | 3.3.5.1 |
| 81 | 1,3-dihydro-1,1,3,3-tetramethyl-2,1,3-benzoxadiarsolinium dinitrate. | | 3.3.5.1 |
| 82 | 1,3-dihydro-1-hydroxy-3-(p-tolyl)-2,1,3-benzoxadiarsole 1,3-dioxide. | | 3.3.5.1 |
| 83 | 1,3-dihydro-1-hydroxy-3-(4-methoxyphenyl)-2,1,3-benzoxadiarsole 1,3-dioxdie. | | 3.3.5.1 |
| 84 | Poly[p-phenylene-(1,3-dihydro-2,1,3-dihydro-3,1,2-benzoxadiarsenolylene)]. | | 3.3.5.1 |
| 85 | 1,1-diphenylarsenanium bromide | | 3.4.1.2 |
| 86 | 1,2,3,4-tetrahydro-2-phenylarsenino[4,3-b]-quinoline-10-carboxylic acid. | | 3.4.1.1 |
| 87 | 1-bromo-1,2,3,4-tetrahydroarsinoline | | 3.4.1.2 |
| 88 | 5-cyano-5,10-dihydroacridarsine | | 3.4.1.2 |

TABLE 1—Continued

| Number | Name | Formula | Preparation [1] |
|---|---|---|---|
| 89 | 5-chloro-5,10-dihydro-2-methylacridarsine | | 3.4.1.2 |
| 90 | 5-chloro-5,10-dihydro-3-methylacridarsine | | 3.4.1.4 |
| 91 | 5,10-dihydro-5-hydroxy-2-methylacridarsine oxide | | 3.4.1.4 |
| 92 | 5-phenyl-10(5H)-acridarsinone | | 3.4.1.4 |
| 93 | 5-phenyl-10(5H)-acridarsinone 5-oxide | | 3.4.1.4 |
| 94 | 5,10-dihydro-5-phenylacridarsine | | 3.4.1.4 |
| 95 | 5-(p-carboxyphenyl)-5,10-dihydro-3-methylacridarsine | | 3.4.1.4 |
| 96 | 5-(p-carboxyphenyl)-5,10-dihydro-3-methylacridarsine 5-oxide | | 3.3.5.3 |

TABLE 1—Continued

| Number | Name | Formula | Preparation[1] |
|---|---|---|---|
| 97 | 5,10-dihydro-5,10-diphenyl-10-acridarsinol | 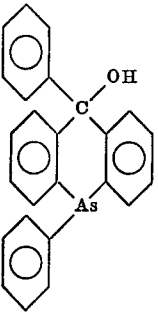 | 3.3.5.3 |
| 98 | 3,3',4,4'-tetrahydro-1,1'(2H,2'H)-spirobisarsinolinium bromide | 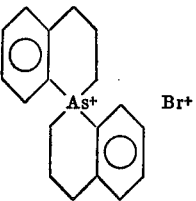 | 3.4.1.4 |
| 99 | 3,3,'4,4'-tetrahydro-1,1'(2H,2'H)-spirobisarsinolinium iodide | 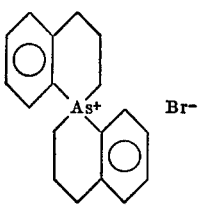 | 3.4.1.8 |
| 100 | 3,3'4,4'-tetrahydro-2,2'(1H,1'H)spirobisarsinolinium bromide | 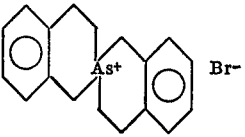 | 3.4.1.8 |
| 101 | 2,3-dihydro-1,4-dimethyl-1,4-ethano-1,4-benzodiarseninium dibromide | 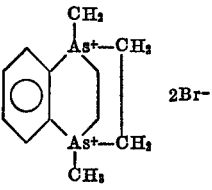 | 3.4.1.2 |
| 102 | 1,2,3,4-tetrahydro-1,1,4,4 tetramethyl-1,4-benzodiarsenium dibromide | 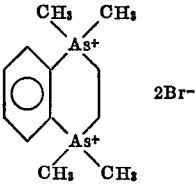 | 3.4.1.2 |
| 103 | 5,10-dihydro-5,10-dimethylarsanthrene | 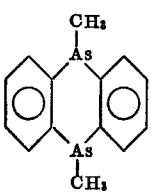 | 3.4.2.2 |
| 104 | Poly(p-phenylene-5,10-arsanthrene) | 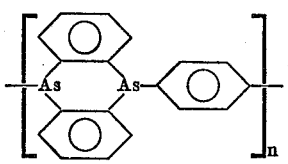 | 3.4.2.2 |

TABLE 1—Continued

| Number | Name | Formula | Preparation |
|---|---|---|---|
| 105 | 5-10-di-p-tolylarsanthrene dibromide | | 3.4.2.2 |
| 106 | 5,10-dihydro-5,10-di-p-tolylarsanthrene 5,10-dioxide | | 3.4.2.2 |
| 107 | 8-chloro-12-hydroxy-γ-benzophenoxarsine 12-oxide | | 3.4.5.1 |
| 108 | 10-chloro-12-hydroxy-γ-benzophenoxarsine 12-oxide | | 3.4.5.1 |
| 109 | 7-hydroxy-α-benzophenoxarsine 7-oxide | | 3.4.5.1 |
| 110 | 12-hydroxy-γ-benzophenoxarsine 12-oxide | | 3.4.5.1 |
| 111 | 7-hydroxy-11-methyl-α-benzophenoxarsine 7-oxide | | 3.4.5.1 |

TABLE 1—Continued

| Number | Name | Formula | Preparation[1] |
|---|---|---|---|
| 112 | 12-hydroxy-10-methyl-γ-benzophenoxarsine 12-oxide | | 3.4.5.1 |
| 113 | 3,9-diphenyl-2,4,8,10-tetraoxa-3,9-diarsaspiro[5,5]hendecane | | 3.4.5.2 |
| 114 | 3,9-di-p-tolyl-2,4,8,10-tetraoxa-3,9-diaraspiro[5,5]hendecane | | 3.4.5.2 |

[1] Preparation as described in shown section number of "Organo-Metallic Compounds," volume III, 2nd edition, edited by M. Dub, from pages 1 to 652.

TABLE 2.—FLAME-RETARDANT POLY(ETHYLENE TEREPHTHALATE) COMPOSITIONS

| Example No. | Additive Type | Weight percent | Flame-retardant rating |
|---|---|---|---|
| 1 | Control | | 1. |
| 2 | Ethylenebis(diphenylarsine) | 10 | 4+. |
| 3 | do | 5 | 4+. |
| 4 | Tetraphenylantimony bromide | 10 | 4. |
| 5 | do | 5 | 1. |
| 6 | Tetraphenylsilane | 10 | 2. |
| 7 | do | 5 | 2. |
| 8 | Tetraphenylarsonium chloride | 5 | 4. |
| 9 | do | 10 | No fiber obtained. |
| 10 | Tetraphenylgermanium | 10 | 3+. |
| 11 | do | 5 | 2. |
| 12 | Triphenyltin hydroxide | 10 | 1-(cross-linked). |
| 13 | do | 5 | Cross-linked. |

Having thus disclosed the invention, what is claimed is:
1. Poly(ethylene terephthalate) compositions having improved flame retardant properties which compositions comprise an organo arsenic compound selected from the group consisting of ethylenebis(diphenyl arsine) and tetraphenyl arsonium chloride at a concentration from about 2 to about 12 percent by weight of said compositions.

References Cited
UNITED STATES PATENTS

| | | | |
|---|---|---|---|
| 3,193,530 | 7/1965 | Oxenriden | 260—440 |
| 3,062,786 | 11/1962 | Pengilly | 260—75 |
| 3,373,225 | 3/1968 | Degginger | 260—45.75 |
| 3,031,425 | 4/1962 | Schoepfle et al. | 260—45.75 |
| 3,109,853 | 11/1963 | Worsley et al. | 260—45.75 |
| 3,624,024 | 11/1971 | Caldwell et al. | 260—45.75 |
| 3,645,962 | 2/1972 | Schwarz | 260—45.75 |
| 3,446,852 | 5/1969 | Birum | 260—440 |
| 3,385,819 | 5/1968 | Gouinlock | 260—45.7 |
| 3,422,125 | 1/1969 | Silver et al. | 260—45.75 |

OTHER REFERENCES

Polyesters by Goodman et al., vol. I, Sat'd Polymers, American Elsevier Pub. Co., New York City, 1965, pp. 78 to 99.

Organo Metallic Compounds, vol. III, 2nd ed., 1968, Springer-Verlag Inc., New York City, pp. 101 and 102.

DONALD E. CZAJA, Primary Examiner

V. P. HOKE, Assistant Examiner

U.S. Cl. X.R.

260—Dig. 24